United States Patent [19]

Borlinghaus

[11] 4,077,619

[45] Mar. 7, 1978

[54] HELICAL COMPRESSION SPRING MADE OF WIRE OF CIRCULAR CROSS SECTION, ESPECIALLY FOR USE IN MOTOR VEHICLES

[75] Inventor: Arthur Borlinghaus, Berghausen, Germany

[73] Assignee: Firma Gebruder Ahle, Karlsthal, Germany

[21] Appl. No.: 656,904

[22] Filed: Feb. 10, 1976

[30] Foreign Application Priority Data

Feb. 15, 1975 Germany ............................ 2506420

[51] Int. Cl.² .............................................. F16F 1/06
[52] U.S. Cl. ................................ 267/166; 267/20 A;
267/62; 267/4; 267/180
[58] Field of Search ........................ 267/4, 168, 60, 61,
267/62, 59, 166, 180, 20 A; 280/724, 725, 726;
213/40, 41; 293/1

[56] References Cited

U.S. PATENT DOCUMENTS

| 380,651 | 4/1888 | Fowler | 267/62 |
|---|---|---|---|
| 1,751,261 | 3/1930 | Wilson | 267/62 |
| 2,666,636 | 1/1954 | Wulff | 267/4 |
| 2,668,278 | 2/1954 | Avery | 267/180 |

FOREIGN PATENT DOCUMENTS

| 511,661 | 8/1939 | United Kingdom | 267/20 A |

*Primary Examiner*—James B. Marbert
*Attorney, Agent, or Firm*—Burgess, Dinklage & Sprung

[57] ABSTRACT

A helical compression spring having a partially progressive characteristic which has a cylindrical portion of constant wire thickness coterminously and integrally joined to a truncoconical portion whose coil of greatest coil diameter is disposed away from the cylindrical portion. The truncoconical portion has inconstant wire thickness with the coils of largest wire diameter being positioned between coils of smaller wire diameter.

5 Claims, 8 Drawing Figures

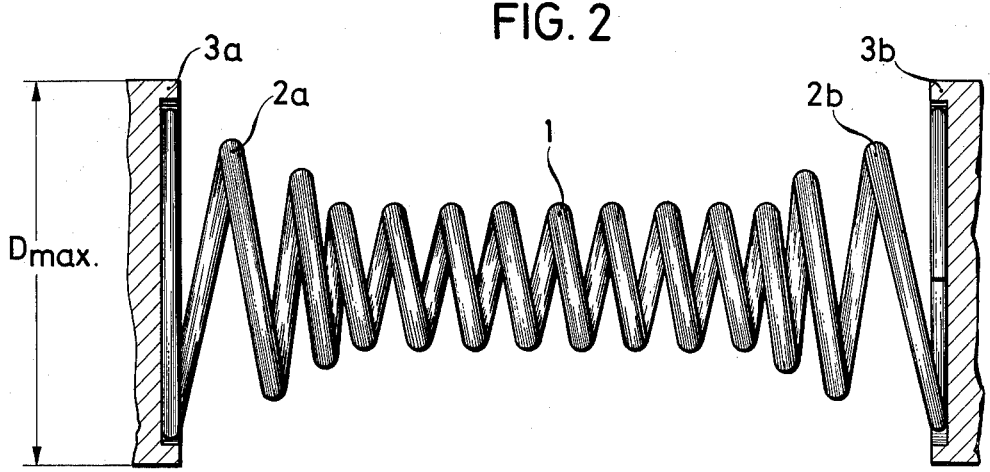
FIG. 2
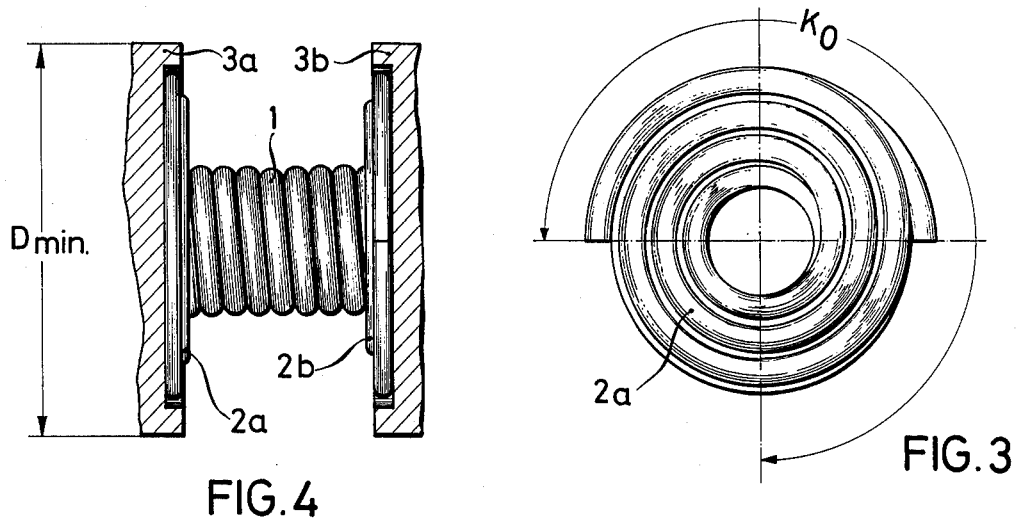
FIG. 4
FIG. 3
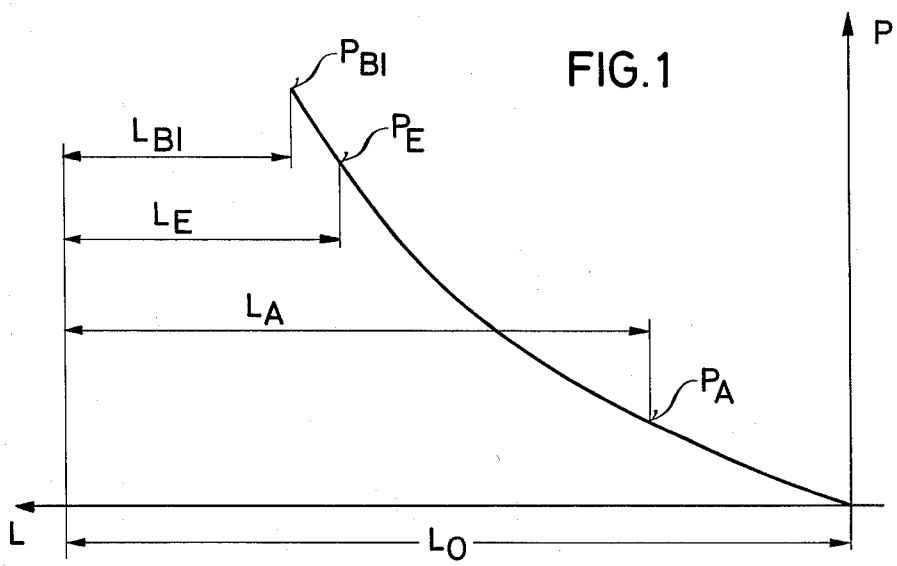
FIG. 1

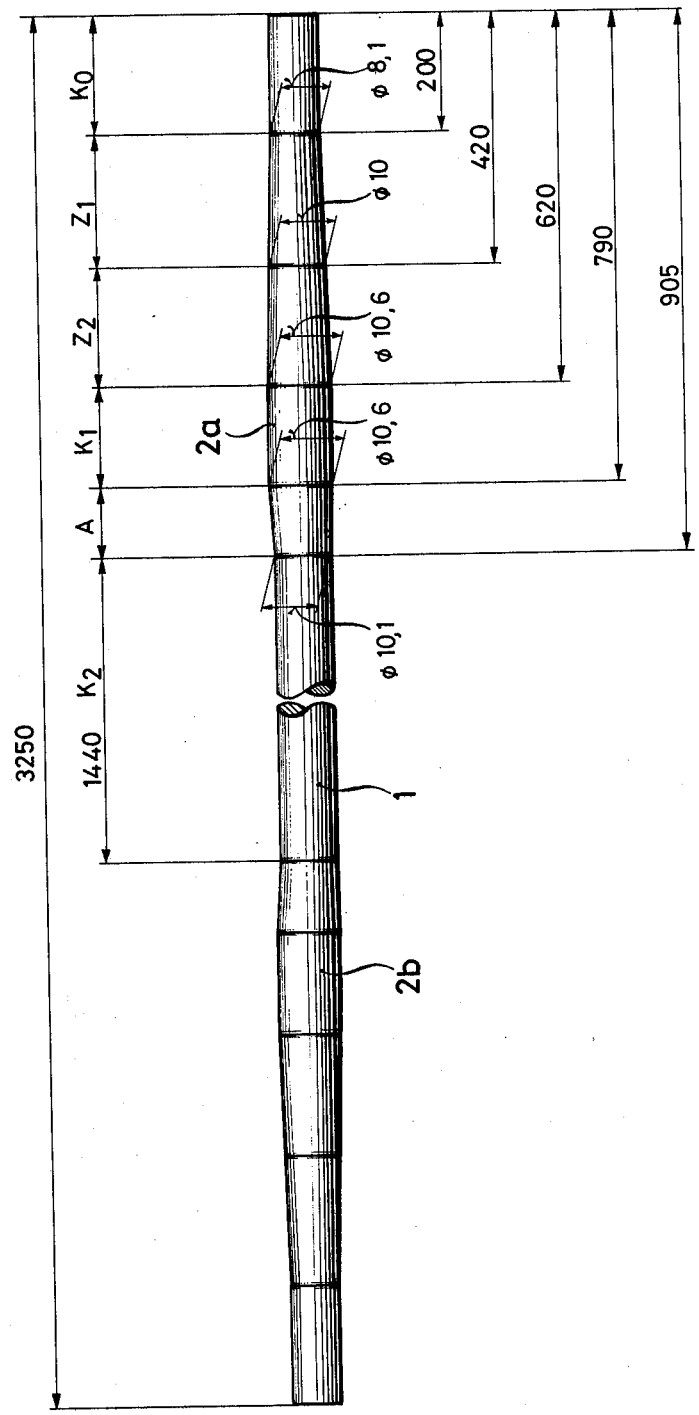

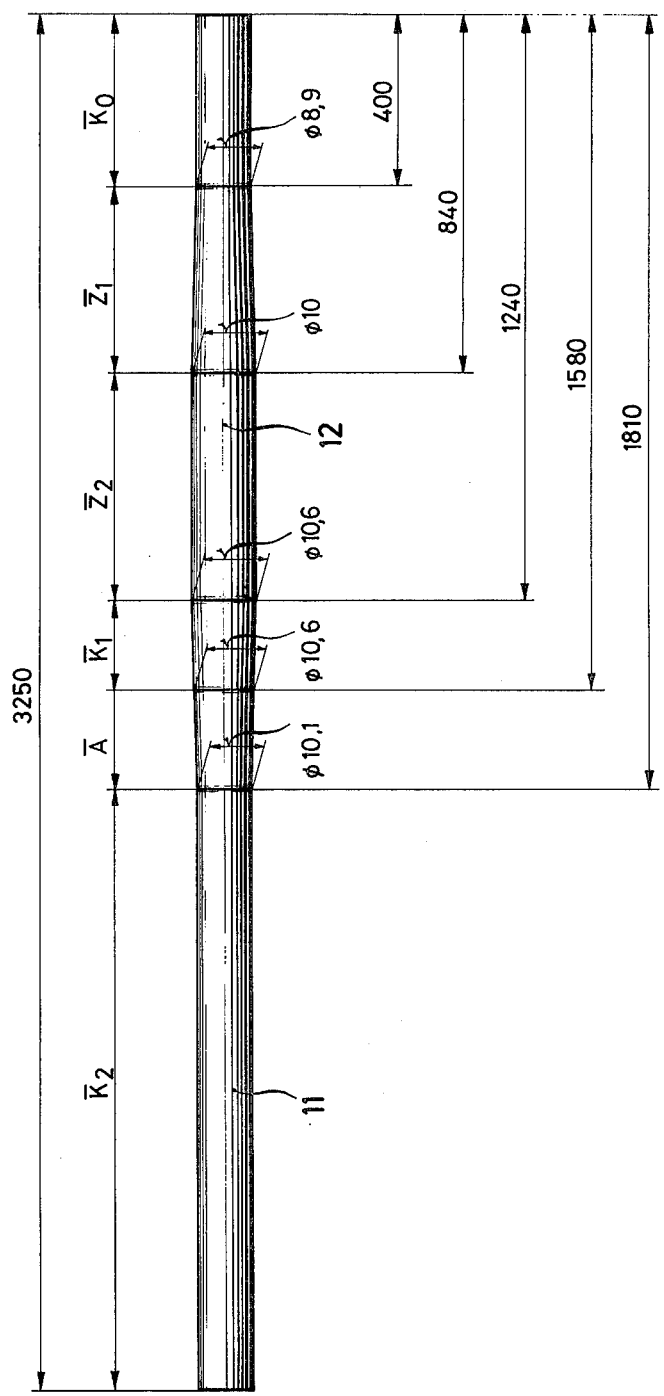

HELICAL COMPRESSION SPRING MADE OF WIRE OF CIRCULAR CROSS SECTION, ESPECIALLY FOR USE IN MOTOR VEHICLES

BACKGROUND OF THE INVENTION

1. Field of the Invention

The invention concerns a helical compression spring wound of wire of circular cross section with a partially progressive characteristic and especially suitable for use in motor vehicle construction, as a chassis spring, for example.

2. Discussion of the Prior Art

Cylindrical helical compression springs having partially progressive characteristics and optimum material utilization are known. The optimum material utilization is achieved by the fact that the springs have an inconstant wire diameter which makes possible a constant material stress in all coils.

One disadvantage of the cylindrical helical compression spring consists in the fact that the coils which have to be flattened successively for the achievement of a progressive characteristic pile up on one another and consequently cause noise. For prevention of the noise, plastic tubing is often drawn over the stacked coils, and this, of course, increases the cost of the springs. Another disadvantage of the cylindrical helical compression spring is to be seen in the fact that the ratio of the largest to the smallest wire diameter is relatively great, as will be shown in greater detail below, and this greatly increases the manufacturing costs, whether the wire diameter is reduced by non-cutting methods or by cutting methods, such as spin drawing or paring.

Single and double truncoconical springs having a partially progressive characteristic are also known, in which the coils which have to be flattened to produce the progressive characteristic lie spirally within one another as the load increases, without touching one another. In the case of these springs, therefore, no noise is produced. However, a severe disadvantage of single and double truncoconical springs is that the ratio of the greatest to the smallest wire diameter is even greater than it is in cylindrical springs, as will be shown more precisely further below.

One common disadvantage of all helical compression springs wound from wire consists in the fact that the pressure center of the spring does not coincide with the geometrical center of the spring, but lies outside of the geometrical center. The result is that the spring exercises a torque on its support when loaded, the magnitude of which is determined by the distance between the two above-named centers.

In the case of the cylindrical helical compression spring, the effective coil diameter which transmits its pressure to the support is constant. As a result, the distance between the geometrical center and the pressure center remains substantially constant. In the case of a single or double truncoconical spring of progressive characteristic, however, this effective coil diameter varies, and does so as the loading increases. As a result, the pressure center migrates outwardly, i.e., away from the geometrical center, as the load increases. The distance between the two centers thus becomes greater as the loading changes, and accordingly the torque exercised on the support increases greatly.

Finally, another disadvantage of single or double truncoconical springs is to be seen in the fact that, for the same characteristic, they have a greater outside diameter than the cylindrical spring, which precludes the use of such springs in existing constructions. Double truncoconical springs furthermore have manufacturing disadvantages, since they cannot simply be wound on a single mandrel.

SUMMARY OF THE INVENTION

Broadly, this invention contemplates a helical compression spring having a partially progressive characteristic, said spring comprising a first truncoconical portion whose coil of largest diameter is positioned at the extremity of the spring, said truncoconical spring having an inconstant wire diameter, the coils of said truncoconical portion having the largest wire diameter being disposed between regions of said first truncoconical portion of lesser wire diameter, one of said regions of lesser wire diameter reaching toward the extremity of said spring, the other of said regions joined integrally and coterminously with a cylindrical spring portion having a constant wire thickness, the coils of said truncoconical portion being disposed in said spring such that at maximum load said coils lie inside one another in the form of a spiral.

The subject matter of the invention is, therefore, a helical compression spring made of wire of circular cross section, which has a partially progressive characteristic, and consists of at least two portions combined in one piece, one of which is a portion of truncoconical shape which is adjoined by a cylindrical portion, optionally joined to another truncoconical portion, such that the coils of greatest diameter are at the extremity (or extremities of the spring where two truncoconical portions are present), the cylindrical portion having a constant wire thickness and each truncoconical portion having an inconstant wire thickness. Under maximum load, the coils of each truncoconical portion lie inside one another in the form of a spiral.

Springs composed of a cylindrical portion and one or two truncoconical portions have previously been proposed. Initially, these known springs have been proposed only for linear characteristics, whereas springs of this type of construction having a progressive characteristics are alleged to have additional disadvantages and therefore their use in motor vehicle construction has been discouraged.

The present invention sets out from the discovery that a helical compression spring of the above-mentioned type of construction surprisingly can offer a number of appreciable advantages over the known springs of different construction mentioned above. The problem to be solved consisted in creating a helical compression spring of this kind which with regard to its characteristic and the buckling resistance to be further described below fulfills the requirements which must be satisfied by springs for use in motor vehicle construction, while at the same time involving moderate use of materials and occupying little space. Furthermore, its overall installed dimensions are to correspond to the dimensions of a cylindrical helical compression spring of the same characteristic, so as to permit its installation in existing constructions.

The solution of this problem is accomplished in accordance with the invention, in a helical compression spring of the above-described construction, generally by the fact that the wire diameter in each truncoconical portion first increases, beginning at its free end, until it attains a value which is greater than the wire diameter of the beginning of the next portion, and then diminishes again down to the wire diameter of the said beginning of the next portion.

In a helical compression spring having a cylindrical portion, this means that the wire diameter of the truncoconical portion, or of each truncoconical portion, at first increases, beginning at its free end, until it attains a value which is greater than the wire diameter of the cylindrical portion, and then it diminishes again to the wire diameter of the cylindrical portion.

It has been found desirable for the wire diameter at the free end of each truncoconical portion to be smaller than the wire diameter at the adjoining extremity of the next portion, such as the cylindrical portion for example. Furthermore, for reasons of ease of manufacture, it can be advantageous to provide each truncoconical portion with a section of constant wire diameter between the section of increasing wire diameter and the section of decreasing wire diameter. Lastly, it has been found advantageous for ease of design and of manufacture for the section of increasing wire diameter in each truncoconical portion to be composed of at least two sections having different rates of diameter increase per unit of length.

Particularly advantageous embodiments of the helical coil spring having a cylindrical portion in accordance with the invention are obtained when the maximum wire diameter in the truncoconical portion is in a ratio of from 1.05 - 1.4 : 1 to the wire diameter of the cylindrical portion. The ratio of the wire length of the entire spring to the wire length of the cylindrical portion of the spring ranges advantageously between 2 - 3 : 1.

BRIEF DESCRIPTION OF THE DRAWINGS

FIG. 1 is a graph showing the relationship of force to spring displacement in a linear-progressive-linear characteristic spring of the invention.

FIG. 2 is a side elevational view of a spring having two truncoconical portions (waisted spring).

FIG. 3 is a top plan view of the spring of FIG. 2.

FIG. 4 is a side elevational view of the spring of FIG. 2 in the completely compressed state.

FIG. 5 shows on a slightly larger scale than that used in FIGS. 2 to 4 the variations in the wire diameter in the spring of FIGS. 2 to 4.

FIG. 8 is a cross section of the wire near the spring of FIGS. 6 and 7.

Figure 6:
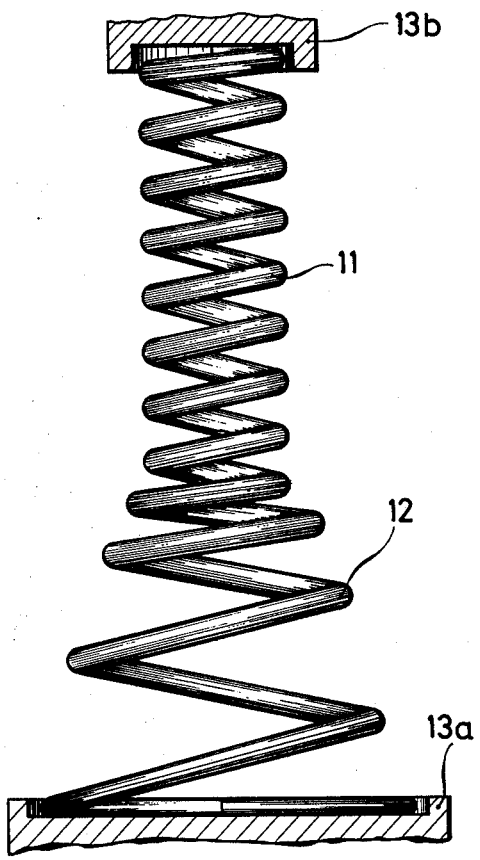
FIG. 6 is a side elevational view of a spring having a truncoconical portion.

The spring of the invention has a characteristic which is represented in general fashion in FIG. 1 of the appended drawings.

In FIG. 1, P represents the working force and L the corresponding spring deflection. From point P corresponding to zero to point $P_A$ the characteristic is linear; from $P_A$ to $P_E$ the characteristic rises progressively, and then from $P_E$ to $P_{B1}$ it again becomes linear. Within the progressive portion of the characteristic curve, the coils of the truncoconical portion or truncoconical portions of the springs of the invention lay themselves successively one inside the other in a spiral and apply themselves to the support surface. If at point $P_E$ all of the coils of the truncoconical portion are flattened, i.e., blocked, the remainder of the characteristic will again be linear; the flattening or blocking of the cylindrical portion of the spring does not generally occur in practice.

Since the coils that are to be flattened are inside of one another and do not touch one another, the spring of the invention is approximately the same as the single or double truncoconical spring as regards its freedom from noise.

It also has an additional advantage of the single or double truncoconical spring, in that the successive application of the end coils to the support surfaces increases the contact area between the spring and the support surface as the loading increases. This brings it about that, as the load increases beyond a certain value, the pressure acting on the support surfaces no longer increases, or at least does not increase as greatly as it does in the case of a cylindrical spring. As a result, a rubber pad inserted between the ends of the spring and the support surfaces for the reduction of noise will be less severely compressed as the loading increases than it would be in the case of an equally loaded cylindrical spring, and therefore a better reduction of noise will be achieved.

In contrast to the single or double truncoconical spring, however, it is the coils of the greatest coil diameter that are the first to be flattened in the spring of the invention. Consequently, as the loading increases, the effective coil diameter which yields its pressure to the support diminishes. This means that the pressure center migrates inwardly towards the geometrical center as the load increases, and that the torque exercised on the support becomes smaller as the loading increases.

The cylindrical portion of the spring of the invention, which is in the middle of the spring or at one end, and which takes over the spring forces after the coils of the truncoconical portion have been flattened, does not break, contrary to what might be expected on the basis of the mathematical considerations applying generally to cylindrical springs, because the forces which occur ahead of the point $P_E$ are supported on a larger coil diameter, namely on the truncoconical portion of the spring at the one or both ends of the spring. In this manner it becomes possible to operate with ratios of the length or diameter of the spring to the spring deflection which in the case of a normal cylindrical helical coil spring would result in buckling, and would therefore necessitate special guiding measures.

As it will be explained later on with the aid of comparative calculations, the spring of the invention offers great advantages with regard to the ratio of the greatest wire diameter in the truncoconical portion to the wire diameter of the cylindrical portion.

DESCRIPTION OF SPECIFIC EMBODIMENTS

The invention will now be explained with the aid of two examples of the embodiment of the spring of the invention illustrated in the appended FIGS. 2 to 8.

The spring represented in FIGS. 2 to 3 has a cylindrical portion 1 of constant wire diameter. The cylindrical portion 1 is adjoined at each extremity by a truncoconical portion 2a and 2b, respectively. The two truncoconical portions 2a and 2b have an inconstant wire diameter, and are so adjoined to the cylindrical portion 1 that their smallest coil diameter directly adjoins the coil diameter of the cylindrical portion and the coils of the greatest diameter are at the extremities of the spring and, in the relaxed state of the spring represented in FIG. 2, they alone lie upon the support surfaces 3a and 3b, respectively.

As it appears from FIG. 3, the two end coils of the spring have a constant wire diameter over a section marked $K_0$ amounting to about ¾ of a turn, that is, over a section which is constantly engaged by the support surfaces and does not participate in the springing action.

In FIG. 4 the spring of FIG. 2 is represented in the completely compressed state, in which the coils of the two truncoconical portions 2a and 2b lie spirally one within the other and the coils of the cylindrical portion 1 lie one on top of the other. Upon the compression of the spring, first the coils of the truncoconical portions 2a and 2b apply themselves to the support surfaces 3a and 3b, respectively, as the loading increases. Not until after the coils of the truncoconical portions are completely flattened against the support surface do the coils of the cylindrical portion 1 become flattened as the loading is further increased.

In FIG. 5 the spring is represented in the unwound state to clarify the variations in the wire diameter. The dimensions given are in millimeters, but this is of secondary importance, since they are intended only to show the length and diameter ratios. Each of the two truncoconical portions 2a and 2b of the springs begins at the outer extremity with a section $K_0$ of constant wire diameter. Its length corresponds, as already stated, to approximately three quarters of a turn of the finished spring. Then follows a section $Z_1$ of increasing wire diameter, another section $Z_2$ also of increasing wire diameter, but increasing to a lesser degree per unit of length, a section $K_1$ of constant wire diameter, and finally a section A of diminishing wire diameter in which the wire diameter decreases from its maximum value to that of the cylindrical portion 1 of the spring. The cylindrical portion of the spring consists only of one section $K_2$ of constant wire diameter.

The ratio of the maximum wire diameter in section $K_1$ to the wire diameter in section $K_2$ in the cylindrical portion has, in the case of the spring illustrated, a value of 1.05. The ratio of the total length of the spring to the length of the cylindrical portion amounts to approximately 2.26.

Figure 7:
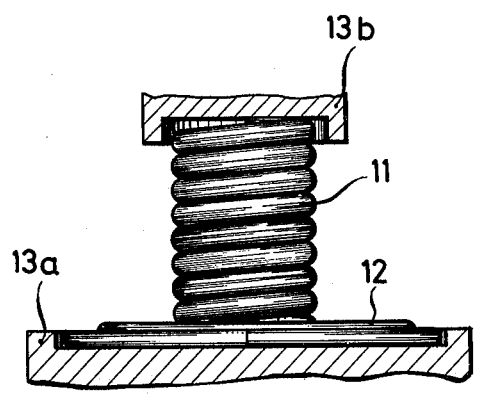
FIG. 7 shows the spring of FIG. 6 in the completely compressed state.

The spring represented in FIGS. 6 and 7 has a cylindrical portion 11 adjoining at its one extremity a truncoconical portion 12 such that the end coil of the truncoconical portion, which has the largest coil diameter, is at the same time the one end coil of the spring. The free end of the truncoconical portion 12 bears against a support surface 13a, while the free end of the cylindrical portion 11 bears against a support surface 13b.

The spring is represented in FIG. 7 in the completely compressed state. The coils of the truncoconical portion 12 lie spirally one inside the other without touching one another, while the coils of the cylindrical portion 11 lie one on top of the other. In this embodiment, too, first the coils of the truncoconical portion 12 lay themselves successively against the support surface 13a as the load increases. Not until all of the coils of the truncoconical portion 12 have been completely flattened do the coils of the cylindrical portion finally become flattened together as the load continues to increase.

To clarify the graduation of the wire diameter, the spring is represented in the unwound state in FIG. 8. The numerical values given again are in millimeters and are intended primarily for illustration of the length and diameter ratios.

At the end of the spring having the truncoconical portion there is a section $\overline{K}_0$ of constant wire diameter extending over three quarters of a turn and forming the portion of the end coil which is always in contact with the support surface. Section $\overline{K}_0$ is adjoined by a section $\overline{Z}_1$ which has an increasing wire diameter. This is followed by a section $\overline{Z}_2$ which also has an increasing wire diameter, but the diameter increases at a lesser rate per unit of length. Section $\overline{Z}_2$ is followed by a section $\overline{K}_1$ of constant wire diameter which is followed by a section $\overline{A}$ of diminishing wire diameter. In section $\overline{A}$ the wire diameter decreases from its maximum value down to the value of the next section $\overline{K}_2$ which forms the cylindrical portion 11 of the spring and has a constant wire diameter.

Comparative calculations have shown that the spring of the invention is clearly superior in some respects to a cylindrical spring and to a double truncoconical spring of the same characteristic curve. This is to be shown hereinafter with the aid of a comparison wherein the following will be compared:

I. A cylindrical helical compression spring of inconstant wire diameter.
II. A double truncoconical spring (barrel spring) of inconstant wire diameter.
III. A spring in accordance with the invention having two truncoconical portions (waisted spring) and an inconstant wire diameter.

The characteristic curves of all three springs are assumed to be equal, and correspond to the curve represented in FIG. 1, FIGS. 1, 2 and 4 of the drawings being arranged on the sheet such that the states of the spring represented in FIGS. 2 and 4 can be projected directly into the diagram of FIG. 1. Uniform stresses $\tau$ form the basis for the individual portions of the characteristic curves.

The characteristic data based on the dimensions given in FIG. 1 are listed in Table 1.

Table 1

|  |  | I | II | III |
|---|---|---|---|---|
| $(P_E)$ | kp/mm | 85 | 85 | 85 |
| $(P_A)$ | kp/mm | 85 | 55.5 | 85 |
| $(P_{B1})$ | kp/mm | 104.5 | 104.5 | 104.5 |
| $L_E$-$L_{B1}$ | mm | 19 | 19 | 19 |
| $L_A$-$L_{B1}$ | mm | 126 | 126 | 126 |
| $L_O$-$L_{B1}$ | mm | 243 | 243 | 243 |

The meanings of the various spring deflections L can be seen in FIG. 1. Since the fully compressed lengths $L_{B1}$ of the various springs I, II and III are quite different, Table 1 shows the deflection which must be associated with the points O, $P_A$ and $P_E$ after deducting the fully compressed length in each case.

The calculation of the springs was performed in a fundamentally known manner, step-wise, by an approximation method (for basic information see Deutsche Industrie Norm 2089; also the independent publication: A. Borlinghaus, "Schraubendruckfedern mit progressiver Kennlinie aus Staeben oder Draehten mit inkonstantem Durchmesser," especially page 15, section 1–4 and section 6, and "Kegelstumpf- und Doppelkegelstumpf-Schraubendruckfedern mit minimaler Bauhoehe, maximaler Werkstoffausnutzung, mit beliebigen linearen oder progressiven Kennlinien aus Draehten oder Staben mit inkonstantem Durchmesser," especially pages 11–18, published by Gebrueder Ahle, Karlsthal). The calculation can best begin with the characteristic curve portion between points $P_E$ and $P_{B1}$, which corresponds to the cylindrical portion of the spring.

With regard to the greatest and smallest wire diameter of the flexing coils in the calculated springs, the following equations result:

I. Cylindrical springs:
$$\frac{d_{max}}{d_{min}} = \sqrt[3]{\frac{P_E}{P_A}}$$

II. Double truncoconical springs (barrel springs):
$$\frac{d_{max}}{d_{min}} = \sqrt[3]{\frac{P_E \cdot D_{max}}{P_A \cdot D_{min}}}$$

III. Springs of the invention (waisted springs):
$$\frac{d_{max}}{d_{min}} = \sqrt[3]{\frac{P_E \cdot D_{min}}{P_A \cdot D_{max}}}$$

In these equations, $d_{max}$ represents the maximum wire diameter, $d_{min}$ the minimum wire diameter or, in the case of the waisted spring, the wire diameter in the cylindrical portion; $P_E$ and $P_A$ are the forces, which can be read in FIG. 1, at the beginning and at the end of the progressive portion of the characteristic curve; $D_{max}$ is the greatest coil diameter and $D_{min}$ is the smallest coil diameter.

From these equations it is easy to see that, for the same ratio of $P_E$ to $P_A$, the ratio of the maximum to the minimum wire diameter is greatest in the double truncoconical spring, and smallest in the waisted spring. This is important not only with regard to the reduction of material consumption accomplished by reducing the wire diameter, but also, due to the high wire diameter ratios, the ratio of $P_A$ to $P_E$ itself is limited in the case of the cylindrical spring and particularly in the case of the double truncoconical spring, on account of the improvement of strength associated with the reduction of the wire diameter by forging or squeezing the wire, and on account of the excessively small residual cross section of the wire in the case of spin drawing, which results in the breakage of the wire by the torsional and tensional forces.

In Table 2 are listed the properties and dimensions of springs I to III which are under comparison.

Table 2

| | I Cyl. spring | II Double truncoconical spring | III Waisted spring |
|---|---|---|---|
| Max. outside diameter, mm | 119 | 166 | 120 |
| Min. outside diameter, mm | 93.5 | 40 | 43.3 |
| Fully compressed length, mm | 102 | 28 | 97 |
| Finished weight kg | 2.098 | 2.073 | 1.995 |
| Largest wire diam. $d_{max}$ mm | 8.85 | 14.60 | 10.60 |
| Smallest wire diam. $d_{min}$ mm | 12.75 | 9.00 | 8.9 |
| $\frac{d_{max}}{d_{min}}$ | 1.44 | 1.62 | 1.19 |

From Table 2 it can be seen that the waisted spring of the invention is approximately equal in its maximum outside diameter to the outside diameter of a cylindrical spring, while the double truncoconical spring has a substantially greater outside diameter. The spring of the invention is of a slightly smaller fully compressed length than a cylindrical spring. These dimensions show that the spring of the invention can be contained in the same space as the cylindrical spring, and is thus interchangeable therewith.

The superiority of the spring of the invention is particularly apparent with regard to the magnitude $d_{max}/d_{min}$. This wire diameter ratio is about 17% lower in the calculated example in the case of the waisted spring versus the cylindrical spring, and about 26% lower in comparison with the double truncoconical spring.

What is claimed is:

1. A helical compression spring having a partially progressive characteristic, said spring comprising a first truncoconical spring portion whose coil of largest diameter is positioned at the extremity of the spring and a cylindrical spring portion, said first truncoconical spring portion having an inconstant wire diameter, the coils of said first truncoconical spring portion having the largest wire diameter disposed between regions of said first truncoconical spring portion of lesser wire diameter, one of said regions of lesser wire diameter working toward the extremity of said spring, the other of said regions joined integrally and coterminously with the cylindrical spring portion having a constant wire thickness, the coils of said first truncoconical spring portion being disposed in said spring such that at maximum load said coils lie inside one another in the form of a spiral and wherein there is integrally and coterminously disposed on said cylindrical spring portion at its end opposed to said first truncoconical spring portion, a second truncoconical spring portion, said second truncoconical spring portion having its end of largest diameter disposed at its extremity away from said cylindrical spring portion, said second truncoconical spring portion being a spring of inconstant wire diameter, the coils of said second truncoconical spring portion of largest wire diameter being disposed between regions of said second truncoconical spring portion of lesser diameter, one of said regions of lesser wire diameter reaching toward the extremity of said spring, the other of said regions joining integrally and coterminously said cylindrical spring portion of constant wire diameter.

2. A helical compression spring according to claim 1 wherein a portion of each coil of the extremity of said first and second truncoconical spring portions opposite said cylindrical spring portion have constant wire diameters.

3. A helical compression spring according to claim 1 wherein the wire diameters at the extremity of said first and second truncoconical spring portions are of lesser diameter than the coils of the regions of the respective truncoconical spring portions adjoining said cylindrical spring portion.

4. A helical compression spring according to claim 1 wherein a portion of each of said first and second truncoconical spring portions containing coils of greatest wire diameter has a constant wire diameter.

5. A helical compression spring according to claim 1 wherein between the extremity of said first truncoconical spring portion and its coil of greatest wire diameter and between the extremity of said second truncoconical spring portion and its coil of greatest wire diameter there are at least two distinct juxtaposed regions of coils in each truncoconical spring portion of inconstant wire diameter, the coils of the regions within a truncoconical position having different rates of increasing wire diameter per unit length.

* * * * *